R. G. ENEVOLDSON, J. R. MARSH & A. P. ENEVOLDSON.
STUMP PULLER.
APPLICATION FILED FEB. 10, 1914.
1,122,087.
Patented Dec. 22, 1914.
5 SHEETS—SHEET 5.
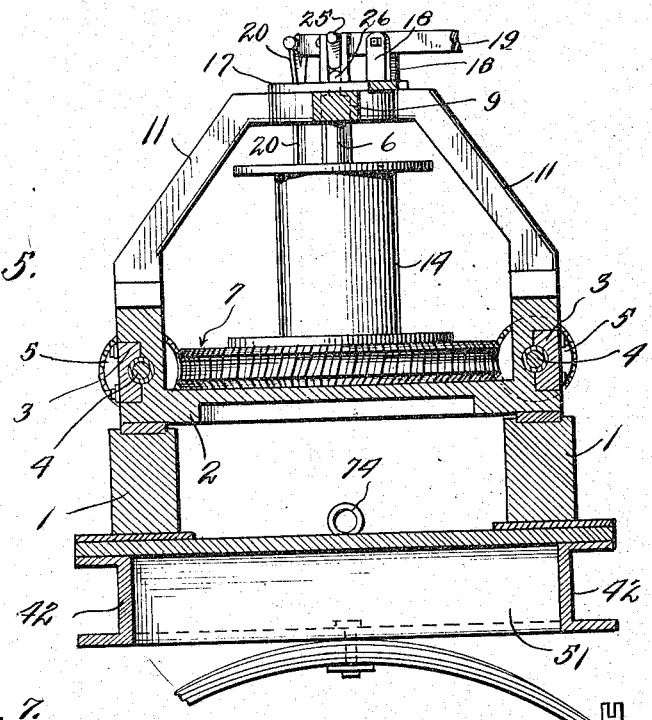
Fig. 5.
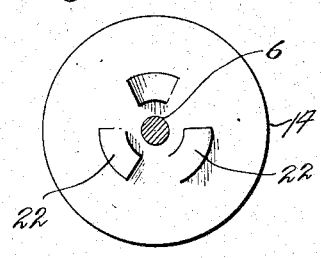
Fig. 7.
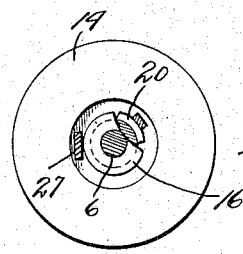
Fig. 8.
Fig. 10.
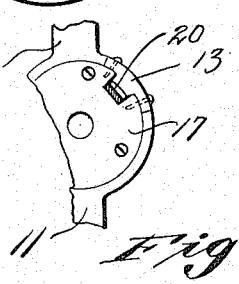
Fig. 9.
Fig. 6.
Witnesses
Inventors
A. P. Enevoldson,
R. G. Enevoldson
and J. R. Marsh
By
Attorney

UNITED STATES PATENT OFFICE.

RALPH G. ENEVOLDSON, JESSE R. MARSH, AND ANDERS P. ENEVOLDSON, OF VIOLA, IDAHO.

STUMP-PULLER.

1,122,087. Specification of Letters Patent. Patented Dec. 22, 1914.

Application filed February 10, 1914. Serial No. 817,946.

*To all whom it may concern:*

Be it known that we, RALPH G. ENEVOLDSON and JESSE R. MARSH, citizens of the United States, and ANDERS P. ENEVOLDSON, a subject of the King of Great Britain, residing at Viola, in the county of Latah and State of Idaho, have invented certain new and useful Improvements in Stump-Pullers; and we do hereby declare the following to be a full, clear, and exact description of the invention, such as will enable others skilled in the art to which it appertains to make and use the same.

The present invention is directed to improvements in stump pullers, and has for its object to so construct a device of this character that the same can be loaded upon a truck and moved from place to place thereon, and then unloaded from the truck to the place desired.

A further object of the invention is to provide a stump puller having a motor adapted to operate the drum of the stump puller, said motor also serving to apply power for moving the truck from place to place.

A still further object of the invention is to provide a drum for stump pullers which is rotated through the medium of worm and worm gears, so that the rotation of the drum will be even.

A still further object of the invention is to provide a novel form of tightener for the belt which imparts rotary movement to the gear shaft.

With these and other objects in view, this invention resides in the novel features of construction, formation, combination and arrangement of parts to be hereinafter more fully described, claimed and illustrated in the accompanying drawing, in which:—

Figure 1:
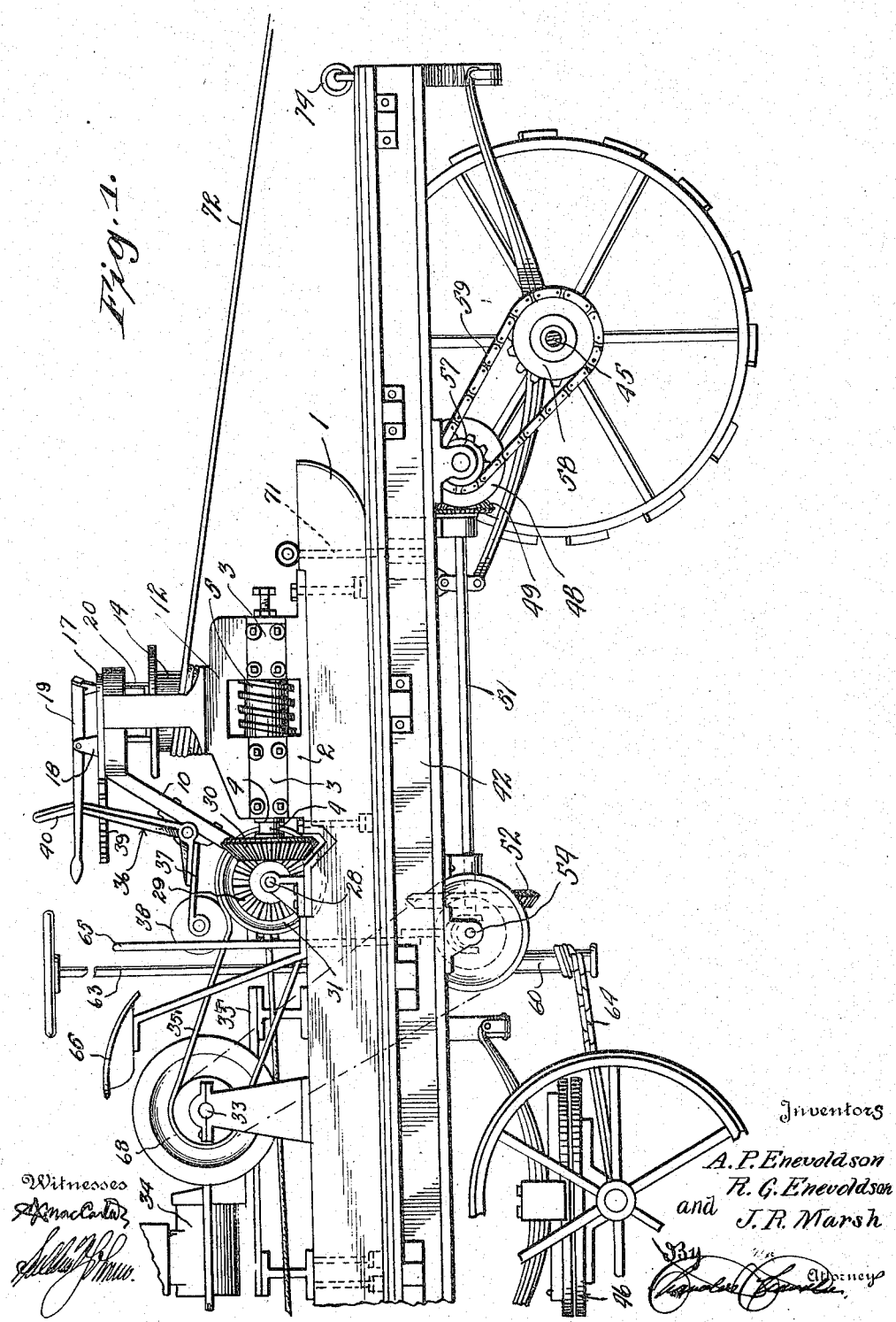
Figure 2:
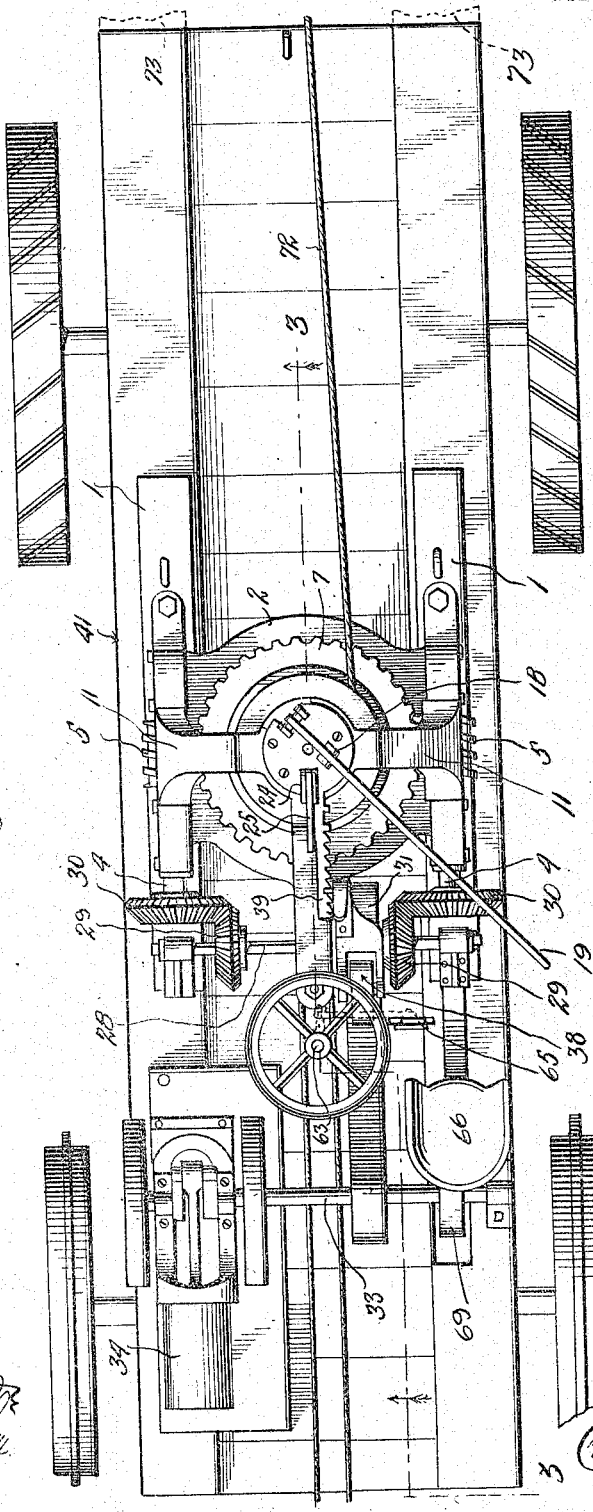
Figure 3:
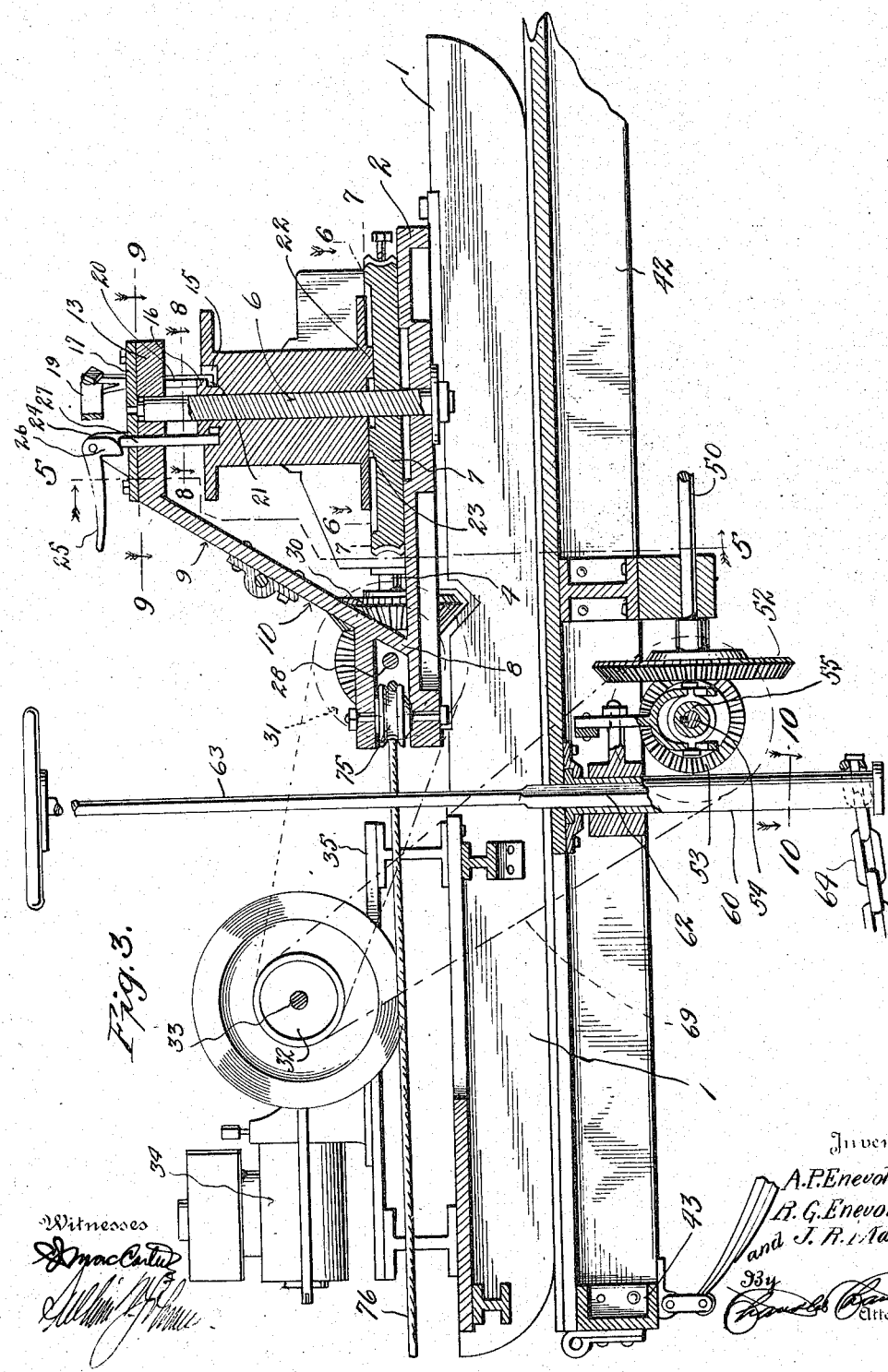
Figure 4:
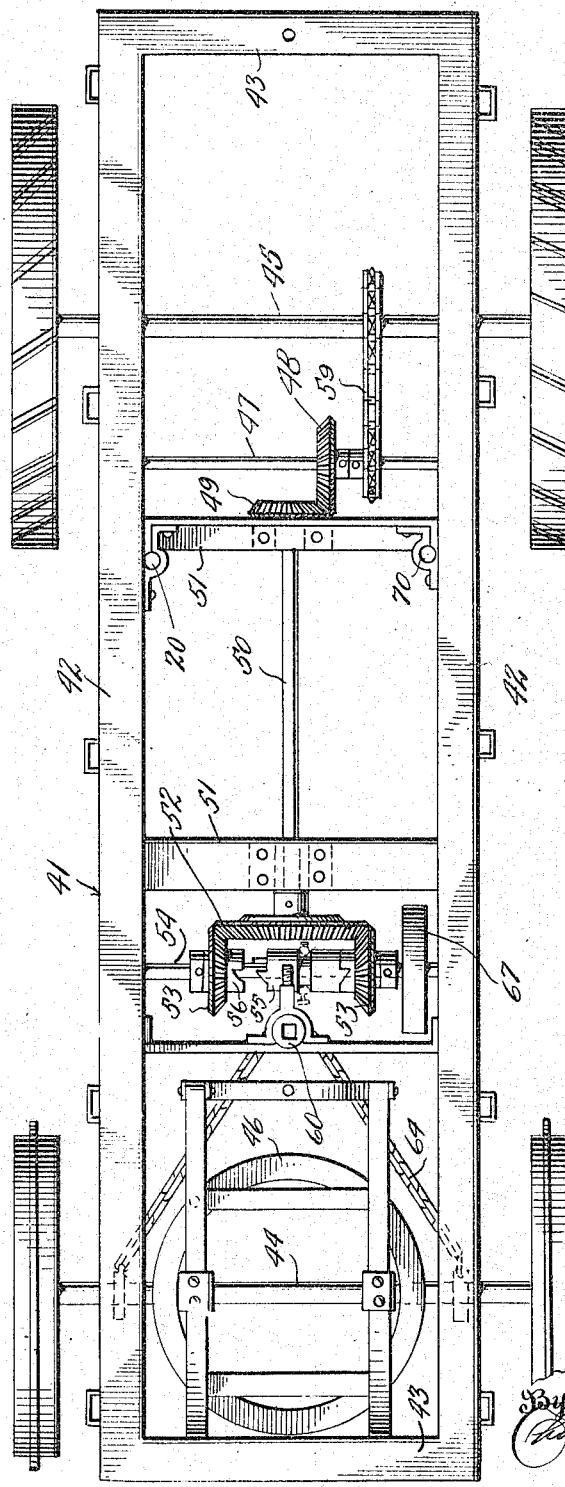

Figure 1 is a side elevation of the stump puller, showing the same mounted upon the truck. Fig. 2 is a top plan view of the stump puller, the same being mounted upon the truck. Fig. 3 is a sectional view on line 3—3 of Fig. 2. Fig. 4 is a top plan view of the truck. Fig. 5 is a sectional view on line 5—5 of Fig. 3. Fig. 6 is a similar view on line 6—6 of Fig. 3. Fig. 7 is a similar view on line 7—7 of Fig. 3. Fig. 8 is a sectional view on line 8—8 of Fig. 3. Fig. 9 is a similar view on line 9—9 of Fig. 3. Fig. 10 is a similar view on line 10—10 of Fig. 3.

Referring to the drawing, the numeral 1 designates a pair of runners, which are held in spaced parallel relation by the casting 2, the outer edges of which are provided with spaced boxes 3 for supporting the ends of the shafts 4. Formed integral with the shafts 4 are worms 5 which occupy the spaces formed between said boxes.

Rising from the center of the casting 2 is a shaft 6 which is rotatably engaged by the worm gear 7, said worm being in mesh with the worms 5 so that when rotary movement is imparted to the shafts 4 similar movement will be imparted to the worm gear, the purpose of which will appear later.

The casting 2 is provided with an extension 8 which supports the arm 9 of the bracket 10, the arms 11 of said bracket being connected to the frames 12 which support the shafts 4, said arms being also connected at their upper ends to the disk 13, and in which is seated the upper end of the shaft 6.

The drum 14 has its upper end provided with an annular groove 15 and the overhanging flange 16. A plate 17 is fixed to the upper surface of the disk 13 and has mounted thereon a bracket 18 which pivotally supports the lever 19 to one end of which is pivotally connected the finger 20, said finger being passed through the plate 17 and disk 13 and has its lower end provided with a lip 21 which engages under the annular flange 16 so that when the lever 19 is rocked in one direction the drum 14 will be moved upwardly so that the teeth 22 formed upon its lower surface will be disengaged from the teeth 23 formed upon the upper surface of the worm gear 7, thereby permitting the worm to rotate the drum or remain stationary. A bracket 24 is also mounted upon the plate 17 and pivotally supports the lever 25, said lever being provided with a cam head 26 which when in the position as shown in Fig. 3 will engage the upper end of the pin 27 so that the lower end thereof will engage the base of the annular groove 15 so that accidental movement of the drum 14 upwardly will be prevented, thereby eliminating the danger of the disengagement of the teeth 22 and 23 during the operation of the drum. It will be of course obvious that when it is desired to raise the drum 14 the head 26 of the lever 25 is swung from engagement with said pin, thus permitting the same to move upwardly with the drum.

Supported transversely of the runners 1 is a shaft 28 which has fixed thereto beveled gears 29 which mesh with the similar gears 30 fixed to one of the ends of the shafts 4. The shaft 28 has also fixed thereto a pulley 31 which is in alinement with the pulley 32 fixed to the shaft 33 of the motor 34, said motor being mounted upon the platform 35 supported by the runners 1. Trained around the pulleys 31 and 32 is a belt 35'.

Pivotally mounted upon the arm 9 of the bracket 10 is an angle lever 36, the arm 37 of which rotatably supports the pulley 38 which normally engages the belt 35 to impart thereto the desired tension, said pulley being held in its adjusted position by the ratchet bar 39 which is supported by the disk 13 and is engaged by the arm 40 of the angle lever 36.

The truck 41 comprises side sills 42 and end sills 43, said truck being supported by the front and rear wheeled axles 44 and 45, respectively, the latter being rotatably connected to the side sills 42 in any suitable manner, while the former is supported by the fifth wheel 46, so that the same can turn in the desired direction for guiding the truck from place to place.

Journaled transversely of the truck 41 is a shaft 47 upon which is fixed a beveled gear 48 which meshes with the beveled gear 49 fixed to the rear end of the shaft 50, said shaft being supported by the bars 51 which are fixed transversely of the truck. The shaft 50 has its forward end provided with a beveled gear 52 which meshes with the similar gears 53 carried by the transverse shaft 54. Keyed upon the shaft 54 is a clutch sleeve 55 which is adapted to engage either one of the clutch collars 56 carried by the gears 52, it being obvious that when the sleeve is disposed centrally of the shaft 54 the shaft 50 will remain idle. A sprocket wheel 57 is fixed to the shaft 47 and in alinement with the sprocket wheel 58 carried by the axle 45, there being a sprocket chain 59 trained around said sprocket wheels, so that when rotary movement is imparted to the shaft 47, similar movement will be imparted to the axle 45 which will propel the truck.

Rotatably supported by the truck is a vertical sleeve 60, the bore 61 of which is square, as clearly shown in Fig. 10 of the drawing, said bore being adapted for removably engaging the squared portion 62 of the steering rod 63 which when rotated will impart similar movement to the sleeve 60 which has connected thereto the chain 64, the ends of which are attached to the front axle 44, thus it will be seen that upon rotation of the sleeve the axle 44 may be swung to guide the truck. The clutch sleeve 55 is shifted through the medium of the lever 65, which when in place is in convenient relation to the operator seated upon the seat 66 which is supported by one of the runners 1 of the stump pulling mechanism, the steering rod 63 being likewise positioned. The shaft 54 has fixed thereto a pulley 67 which is in alinement with the pulley 68, which is fixed to the shaft 33, said pulleys being connected by a belt 69. Thus it will be seen that when the stump pulling mechanism is mounted upon the truck that the belt 69 will impart rotary movement to the shaft 54, thus propelling the truck, it being of course understood that the belt 69 is removed from engagement with the pulley 68 when the stump pulling mechanism is being removed from the truck, or when it is being placed thereon.

By detachably connecting the steering rod 63 in the manner described, the same can be readily removed when the stump pulling mechanism is to be moved from or returned to the truck, and is only engaged with the sleeve 60 when the truck is being moved from place to place.

The truck 41 is provided with sockets 70 which receive the lower ends of the pins 71 which are carried by the runners 1 of the stump pulling mechanism, thus securely holding the runners in fixed relation to the truck when the stump pulling mechanism is loaded thereon. A cable 72 is provided and has one end fixed to the drum 14, said cable having its other end provided with a suitable grapple, (not shown) for engaging the stump to be pulled.

After the truck has been propelled to the proper place a cable 72 is fastened to a stump and rotary movement imparted to the drum, whereupon the cable will wind thereupon, which action will cause the runners 1 to slide off the truck and down upon the detachably connected skids 73 to the ground, said skids being shown in dotted lines in Fig. 2 of the drawings and are attached to the rear end of the truck when being used for removing the stump pulling mechanism from the truck.

After the stump pulling mechanism has been lowered to the ground it is ready to perform its function as a stump puller, as the motor 34 forms a part of the stump pulling mechanism. After the stump puller is upon the ground the motor 34 is started and through the medium of the belt 35 rotary movement is imparted to the shaft 28 which in turn imparts rotary movement to the shafts 4 which carry the worm 5 in mesh with the worm gear 7, thus rotating the same together with the drum 14 which can as before stated be raised so as to remain idle while the worm gear 7 revolves, thus permitting the motor to run continuously.

When it is desired to load the stump puller upon the truck the cable 72 is attached to the ring 74 mounted upon the rear sill 43, after which the motor is started, and as the drum rotates the cable 72 will be wound thereupon, and during the winding of which the stump puller will be drawn upon the truck, it being of course understood that the skids are then connected to the front of the truck. After the stump puller is properly positioned upon the truck, the belt 69 is trained around the pulleys 67 and 68, and during the operation of the motor the shaft 50 may be rotated in the direction desired upon shifting of the clutch sleeves 55.

Rotatably mounted between the lower end of the arm 9 of the bracket 10 and extension 8 of the casting is a grooved pulley 75 and upon which is looped a cable or rope 76 which is designed to be attached to a stump or other fixed object during the operation of the stump puller when the same is upon the ground.

What is claimed is:—

1. A stump puller comprising a pair of runners, a casting supported by the runners, a worm gear rotatably mounted upon the casting, a drum having depressions in its lower face, projections on the gear arranged to interlock with the depressions, means for raising the drum out of interlocking engagement with the worm gear and means for preventing the accidental disengagement of the gear and the drum.

2. A stump puller comprising a pair of runners, a casting mounted upon the runners, a shaft supported by the casting, a worm gear revolubly mounted upon the casting, a drum having a flanged head on its upper end adapted for interlocking engagement with the worm gear, shafts supported by the casting, worms carried by the shafts, and meshing with the worm gear, means for rotating the shafts to rotate the worm gear, and means for raising the drum from interlocking engagement with the worm gear, comprising a link engaging the flanged head of the drum, and means to lock said drum in its operative position comprising, a pin arranged to engage the upper face of the drum and a cam lever pivoted to the casting and engaging the upper end of the pin.

3. A device of the class described comprising a pair of runners, a casting supported by the runners, a worm gear rotatably mounted upon the casting, a drum having interlocking engagement with the worm gear, said drum having an annular groove formed in its upper end, an annular flange overhanging the groove, a disk supported above the drum, brackets supported by the disk, a lever pivotally supported by one of the brackets, a finger pivotally connected to the lever and having a lip formed upon its lower end for engaging the flange for moving the drum from engagement with the worm gear when said lever is rocked in one direction.

4. A device of the class described comprising a pair of runners, a casting supported by the runners, a worm gear supported upon the casting, means for rotating the worm gear, a drum having interlocking engagement with the worm gear, an annular groove formed in the upper end of the drum, a flange overhanging the groove, means for engaging the flange to move the drum from interlocking engagement with the worm gear, a pin having its lower end engaging the groove, and means engaging the upper end of the pin to hold the lower end thereof in the groove to hold the drum and worm gear in interlocking engagement.

5. A stump puller comprising a pair of runners, a casting supported thereby, boxes supported by the casting, shafts supported in the boxes, worms carried by the shafts, a worm gear supported by the casting and adapted to mesh with the worms, a drum having interlocking engagement with the worm gear, beveled gears fixed to the shafts, a transverse shaft having beveled gears thereon for meshing with the first named beveled gears, a pulley fixed to the transverse shaft, a motor supported by the runners, a belt connecting the motor and pulley for transmitting rotary movement to the transverse shaft and worms, whereby the worm gear is rotated, and means for moving the drum from interlocking engagement with the worm gear.

In testimony whereof, we affix our signatures in presence of two witnesses.

RALPH G. ENEVOLDSON.
JESSE R. MARSH.
ANDERS P. ENEVOLDSON.

Witnesses:
S. B. H. McGOWAN,
EMMA JUNGE.